United States Patent
Rodgers

(10) Patent No.: US 6,711,272 B2
(45) Date of Patent: Mar. 23, 2004

(54) ADJUSTABLE MICROPHONE STAND

(76) Inventor: Aletha B. Rodgers, 521 N. Avenue 53, Los Angeles, CA (US) 90042

( * ) Notice: Subject to any disclaimer, the term of this patent is extended or adjusted under 35 U.S.C. 154(b) by 191 days.

(21) Appl. No.: 09/841,090

(22) Filed: Apr. 24, 2001

(65) Prior Publication Data

US 2002/0154789 A1 Oct. 24, 2002

(51) Int. Cl.$^7$ ............................................... H04R 11/04
(52) U.S. Cl. ....................... 381/363; 381/361; 381/362; 381/366
(58) Field of Search ................................. 381/361, 362, 381/363, 366, 355, FOR 147, FOR 148; 362/250, 410, 414, 411, 413, 418; 248/121

(56) References Cited

U.S. PATENT DOCUMENTS

| | | | | |
|---|---|---|---|---|
| 681,813 A | * | 9/1901 | Ries ............................ | 381/362 |
| 3,153,123 A | * | 10/1964 | Harman ....................... | 381/363 |
| 5,155,667 A | * | 10/1992 | Ho .............................. | 362/414 |
| 5,800,054 A | * | 9/1998 | Lo ............................... | 362/250 |
| 6,264,350 B1 | * | 7/2001 | Swanson ..................... | 362/414 |

* cited by examiner

Primary Examiner—Huyen Le
(74) Attorney, Agent, or Firm—Law Offices of Kamran Fattahi

(57) ABSTRACT

An adjustable microphone stand is disclosed and includes a base having a protrusion extending from a surface thereof. A plurality of extension segments are configured to detachably connect to the base protrusion and an adjoining extension segment to adjust the height of the microphone stand. Each extension segment includes a protrusion extending from one end thereof, which is typically threaded, and a depression formed in an opposite end, which is interiorly threaded, so that each extension segment can be mated with either the base protrusion or an adjoining segment protrusion. Preferably, the extension segments are of varying lengths to facilitate adjustability of the microphone stand. The base also preferably includes a plurality of apertures through which fasteners can be inserted to fix the base to a surface, such as a wall.

13 Claims, 2 Drawing Sheets

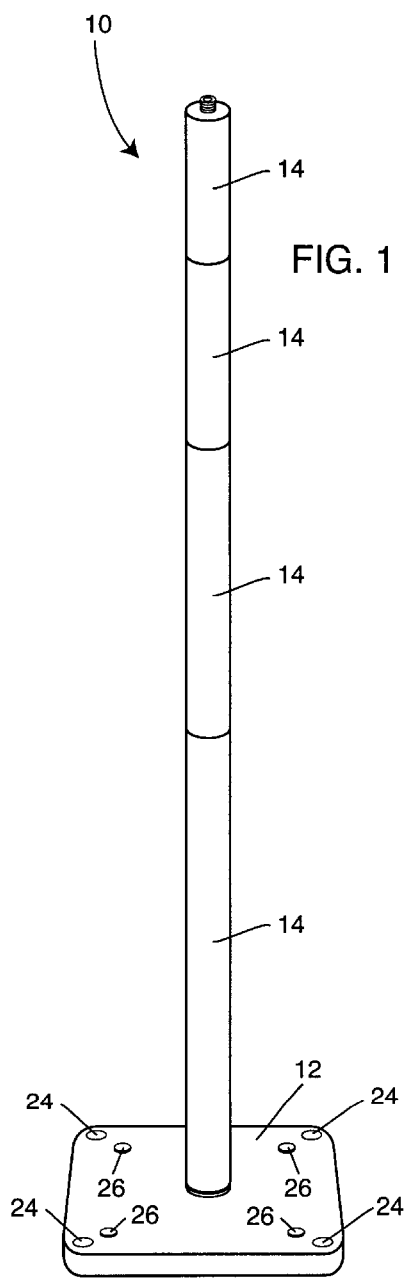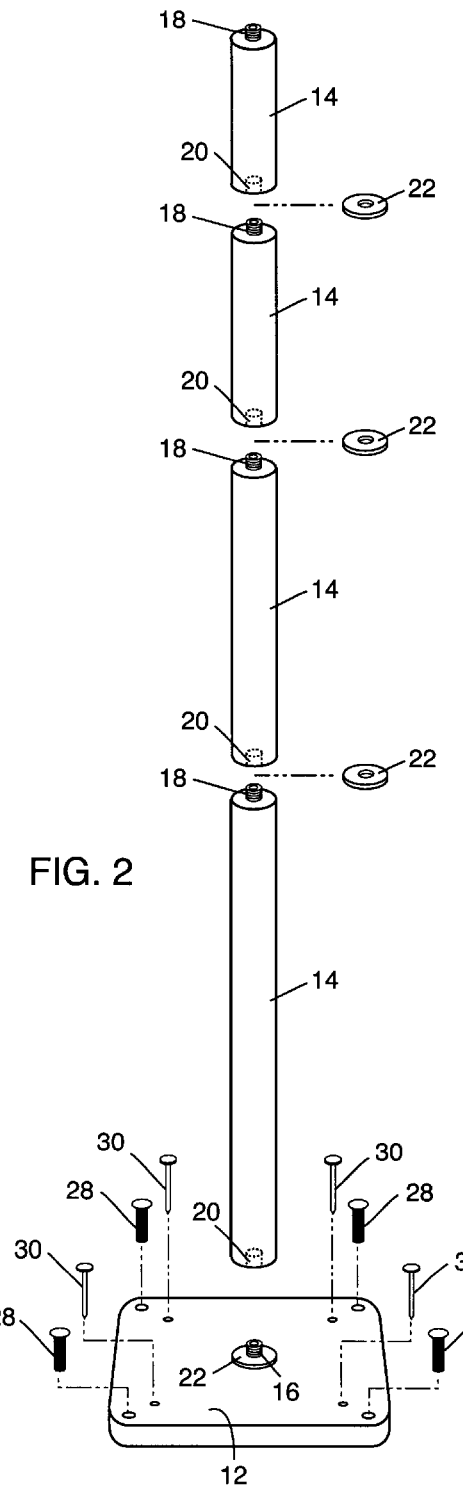
FIG. 1
FIG. 2

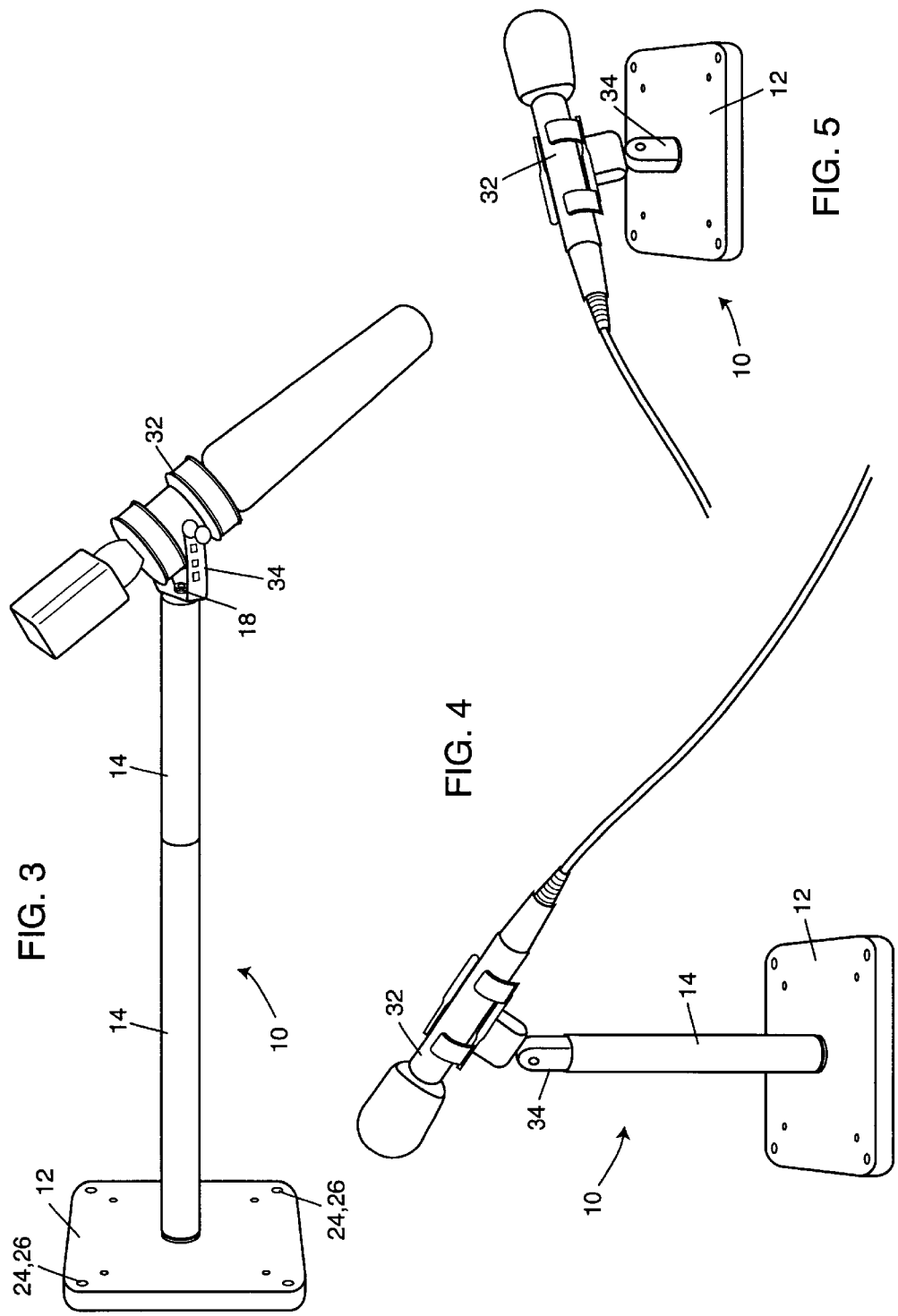

ADJUSTABLE MICROPHONE STAND

BACKGROUND OF THE INVENTION

The present invention relates generally to microphones used on a film or television shooting set. More particularly, the present invention relates to a microphone stand which is adjustable in height and can be planted onto a variety of surfaces.

The microphone stands currently offered are either, a tall stand commonly used by live bands and singers which is slightly adjustable in height, a microphone boom consisting of a microphone attached to a pole held in position by an operator, or a one-foot high table stand commonly used in voice-over recording booths and radio stations. The microphone boom poles commonly used on a film or television shooting set are approximately six to eighteen feet long. In use, a boom operator holds a boom pole with a mike attached to an end thereof in order to record the actor's dialog. While generally satisfactory, there are instances when the boom operator cannot get in close enough to properly record the dialog with the boom pole. This may be due to a variety of circumstances, including shadows created by the boom pole or boom pole operator, wide master shots wherein the effective range of the boom pole is exceeded, etc.

In such instances where a boom pole cannot be used, dialog is recorded using either plant microphones or radio microphones. A plant microphone comprises a microphone which is placed out of view of the camera, but is close enough to capture the dialog. Currently, there are only a few ways to plant a microphone. One is by placing the microphone on a sand bag close to where the dialog will occur. This is often awkward since the microphone is short of the proper height and angle. Sometimes a recording studio microphone stand, typically one foot in length, is used with a microphone attached to the end. However, the stand may be too short or too tall for a given situation as the microphone must be within range to adequately capture the dialog, yet hidden from view of the camera. A microphone may also be taped directly to a vertical surface, such as a wall or fence. However, the microphone is often too heavy and falls off during recording.

Many sound mixers revert to radio microphones positioned on the actors themselves. This also presents problems in that a great deal of time is expended in concealing these microphones from the view of the camera. Also, a radio microphone planted on the actor does not produce the natural sound quality of a properly planted microphone or properly placed boom microphone.

Accordingly, there is a need for a microphone stand which can be planted near the point where the dialog will occur and adjustable in height so as to properly record the dialog. What is also needed is a microphone stand which is sufficiently stable so as to eliminate the need to prop the microphone with other stabilizing devices. What is also needed is a microphone stand which is capable of being securely fixed to a surface, such as a vertical surface. The present invention fulfills these needs and provides other related advantages.

SUMMARY OF THE INVENTION

The present invention relates to a microphone stand which is capable of being planted near positions of dialog while being adjustable in height to properly record the dialog. The adjustable microphone stand in its simplest form comprises a planar base having an exteriorly threaded protrusion extending from a surface thereof. Preferably, the protrusion extends from a central portion of the base. A microphone is attachable to the protrusion of the base so as to be securely positioned thereon. Typically, the microphone includes a bracket which is configured to accept the protrusion of the base.

In a particularly preferred form, the adjustable microphone stand includes a plurality of extension segments. Each extension segment is configured to detachably connect to the base protrusion and an adjoining extension segment. Typically, each extension segment includes a protrusion which is exteriorly threaded and extending from one end of the segment. A depression, which includes interior threads, is formed in an opposite end of the segment. The depression is configured to be mated with the base protrusion, or an adjoining segment protrusion. Preferably, the extension segments are of varying lengths to permit a user to adjust the microphone to any number of heights. Preferably, felt or leather washers are inserted between the extension segments and base connection points to ensure a tight fit and to prevent damage to the individual components.

The base itself is comprised of a solid and heavy material, such as aluminum or the like, for added support and stability. The base includes a plurality of apertures therethrough for insertion of fasteners, such as nails or screws, so that the base can be fixed to a surface, such as a wall. The apertures may be of varying sizes to accept fasteners of varying widths.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view of an assembled microphone stand embodying the present invention;

FIG. 2 is an exploded view of the microphone stand of FIG. 1 illustrating the various components thereof;

FIG. 3 is a perspective view of the adjustable microphone stand of the present invention fastened to a vertical surface and supporting a microphone at an end thereof;

FIG. 4 is a perspective view of a microphone attached to a single segment of the microphone stand; and FIG. 5 is a perspective view of a microphone attached directed to a base of the microphone stand.

DETAILED DESCRIPTION OF THE PREFERRED EMBODIMENTS

As illustrated in the accompanying drawings, the present invention is directed to an adjustable microphone stand, generally referred to by the reference number 10. The microphone stand 10 generally comprises a base 12 and a plurality of interchangeable segments 14. As illustrated in FIG. 1, the segments 14 are preferably of varying lengths to permit the microphone stand 10 to be adjusted to a number of heights.

Referring now to FIG. 2, the base 12 of the stand 10 includes a protrusion 16 extending from an upper surface thereof. Preferably, the protrusion 16 is approximately centered in the base 12 and includes exterior threads so as to form a bolt-like member. Typically, the protrusion 16 is 0.375 inches in diameter and threaded to mimic a ⅜" bolt, although it is not limited to such. The protrusion 16 may be attached to the top surface of the base 12 or comprise a bolt which is inserted through an aperture formed in the base 12 and secured thereto.

With continued reference to FIG. 2, each segment 14 includes a protrusion 18 attached to or otherwise extending from an end thereof which substantially mimics the base protrusion 16. Thus, in a particularly preferred embodiment, the segment protrusions 18 comprise a ⅜" bolt-like member extending from an end of each segment 14. However, it is to be understood that such protrusions 18 can have other configurations which allow the segments 14 to be snap-fitted to one another or attached in other ways.

At an end of each segment 14 generally opposite the protrusion 18 is formed a depression 20 which is configured to receive either the base protrusion 16 or an adjoining segment protrusion 18. In the particularly preferred embodiment illustrated, such depression 20 is interiorly threaded with female threads so as to mate with the male threaded protrusion 16 or 18.

The segments 14 are preferably cylindrical in shape, although not limited to such design. The segments 14 are comprised of a durable material, such as metal or hardened plastic, which can withstand the weight of an attached microphone, and ensure repetitive use.

In a particularly preferred embodiment, the extension segments 14 comprise two 3" aluminum rods, two 4" aluminum rods, two 6" aluminum rods, and two 10" aluminum rods to provide an enormous amount of height adjustability. Preferably, the base plate 12 and segment 14 are anodized black to avoid reflection and blend in with the film set.

Washers 22 are typically inserted between the segments 14 to be attached to one another to provide a tight fit between the segments 14 and prevent damage which could arise by the contact of the adjoining segments 14. Such washers 22 are typically comprised of a relatively soft or resilient material such as felt or leather or other suitable material.

The base 12 includes a plurality of apertures 24 and 26 which are spaced from one another about the base 12 and sized to accept fasteners, such as the illustrated screws or bolts 28 and nails 30. As illustrated, one set of apertures 24 are preferably larger in diameter than another set of apertures 26 so that the apertures can accommodate fasteners 28 and 30 of varying dimensions. With this arrangement, the base 12 can be secured to a surface to prevent the stand 10 from slipping out of place.

With reference to FIG. 3, a microphone stand 10 having two segments 14 attached to the base 12 is shown supporting a microphone 32 and mounted to a wall or vertical surface by means of the fasteners 28 and 30 inserted through the apertures 24 and 26 of the base 12 and into the vertical surface. The microphone 32 illustrated in FIG. 3 is wireless, and includes a bracket 34 which is configured to receive the uppermost segment protrusion 18. In this case, the bracket 34 includes an aperture through which the protrusion 18 can be threaded, or inserted through and a nut attached to the protrusion to secure the microphone 32 to the stand 10.

The ability to attach the stand 10 to a vertical surface provides flexibility and benefits which are not present in existing microphone stands. For example, the microphone stand 10 can be attached to a fence or wall and the microphone 32 extended out a distance from the wall or fence towards the actors, but not within site of the camera, to record the dialog between the actors. Another exemplary use is to fasten the stand 10 to a wall adjacent a coat rack such that the microphone stand 10 and microphone 32 are hidden behind coats in order to record the dialog as an actor enters a room. The sound mixer could then blend dialog from the planted microphone within the coat rack, with the boom microphone as the actor moves throughout the room and dialog proceeds.

Referring now to FIG. 4, a microphone stand 10 having only one segment 14 attached to the base is illustrated supporting a microphone 32. It is to be understood that segment 14 can be selected for its height, or alternatively be attached to other segments 14 to alter the overall height of the microphone 32. Due to the weight and sturdiness of the base 12, the microphone 32 may be positioned in a number of locations, such as on the floor board between passengers of a vehicle, or hidden behind a plant or other object to remain out of view of the camera while capturing the dialog between actors. If found necessary, fasteners 28 and 30 can be inserted through apertures 24 and 26 of the base 12 to securely mount the stand 10 in place.

Although it may be desirable to position the microphone 32 on one or more connected segments 14, the microphone can also be directly attached to the protrusion 16 of the base. As boom microphones and the like typically include a bracket or holder 34 which includes means for attachment to a ⅜" threaded bolt, typically the means of attaching the microphone to the boom pole, the microphone is easily attached to the segment 14 or base 12 by threading the bracket 34 onto the protrusion 16 or 18 directly. Attaching the microphone 32 directly onto the base 12 provides a very low profile planted microphone 32.

The microphone stand base 12 is preferably comprised of a sturdy heavy material, such as aluminum, so that it can remain stable and not fall over with the weight of the attached microphone. Preferably, the base is approximately 6" in diameter.

It can be appreciated from the foregoing that a sound person using the microphone stand 10 of the present invention is capable of selecting different heights for the planted microphone 32. Virtually any existing microphone used in sound kits may be used, such as the Sennheiser 416, the Sennheiser MKH-50 or MKH-60, or Schoeps. The microphone 32 can be placed onto the microphone stand 10 instead of screwing it onto the end of the boom pole, with extension segments 14 added or removed to adjust the microphone to the proper height.

The microphone stand 10 of the present invention can be used in a variety of different circumstances. For example, a Schoeps microphone having a right angle can be used as a plant mike attached directly to the base 12 and positioned on a coffee table where the actor sits on the sofa for dialog in a wide shot where the boom mike cannot reach. A statuette or the like can be placed on the table to conceal the microphone. As discussed above, planting a microphone in such a scenario provides a more natural sound than a radio mike attached to the actor would.

Another instance using the present invention would be to adjust the microphone stand 10 to its proper height and place the stand 10 on the floor between two actors seated around a dining table to catch their dialog as they lean together to whisper to one another. Since they are leaning in towards one another, the planted microphone 10 would capture their whispers much better than the overhead boom microphone. Also, two or more microphone stands 10 can be used as the situation requires, such as in a large party scene where the primary dialog occurs in more than one area of the room.

Although several embodiments have been described in detail for purposes of illustration, various modifications may be made without departing from the scope and spirit of the invention. Accordingly, the invention is not to be limited, except as by the appended claims.

What is claimed is:

1. An adjustable microphone stand, comprising:
   a generally planar base having a protrusion extending from a surface thereof, and a plurality of apertures therethrough for insertion of fasteners so as to be fixed to a non-horizontal surface;
   a plurality of extension segments, each extension segment being configured to detachably connect to the base protrusion and an adjoining extension segment; and
   a microphone attachable to the protrusion of the base or uppermost extension member;
   wherein the stand can rest on horizontal surfaces, or be fixed to non-horizontal surfaces by inserting fasteners through the apertures of the base and into the non-horizontal surface; and
   wherein the length of the stand can be adjusted by altering the number of extension segments connected to the base, and one another.

2. The stand of claim 1, wherein the microphone includes a bracket configured to accept the protrusion of the base.

3. The stand of claim 1, wherein each extension segment includes a protrusion extending from one end thereof and a depression formed in an opposite end thereof and configured to be mated with either the base protrusion or adjoining segment protrusion.

4. The stand of claim 3, wherein the depression of each extension segment is interiorly threaded and the protrusion of each extension segment includes exterior threads which mate with the interior threads of the depressions.

5. The stand of claim 1, wherein the plurality of extension segments are of varying lengths.

6. The stand of claim 1, wherein the apertures are of varying sizes to accept fasteners of varying widths.

7. The stand of claim 1, including a washer inserted between extension segment and base connection points.

8. An adjustable microphone stand, comprising:
   a base having a protrusion extending from a surface thereof;
   a plurality of extension segments of varying lengths, each extension segment including a protrusion extending from one end thereof and a depression formed in an opposite end thereof and configured to be mated with either the base protrusion or adjoining segment protrusion; and
   a microphone having a bracket configured to accept and be attachable to the protrusion of either the base or upper extension segment;
   wherein the height of the stand can be adjusted by altering the number of extension segments connected to the base and one another.

9. The stand of claim 8, wherein the depression of each extension segment is interiorly threaded and the protrusion of each extension segment includes exterior threads which mate with the interior threads of the depressions.

10. The stand of claim 8, wherein the base includes a plurality of apertures therethrough for insertion of fasteners so as to be fixed to a surface.

11. The stand of claim 10, wherein the base apertures are of varying sizes to accept fasteners of varying widths.

12. The stand of claim 8, including a washer inserted between extension segment and base connection points.

13. An adjustable microphone stand, comprising:
   a base having a protrusion extending from a surface thereof, the base including a plurality of apertures of varying sizes therethrough for insertion of fasteners of varying widths so as to be fixed to a non-horizontal surface;
   a plurality of extension segments of varying lengths, each extension segment including an exteriorly threaded protrusion extending from one end thereof and an interiorly threaded depression formed in an opposite end thereof and configured to be mated with either the base protrusion or adjoining segment protrusion;
   a washer inserted between extension segment and base connection points; and
   a microphone including a bracket configured to accept the protrusion of either the base or upper extension segment;
   wherein the stand can rest on horizontal surfaces, or be fixed to non-horizontal surfaces by inserting fasteners through the apertures of the base and into the non-horizontal surface; and
   wherein the length of the stand can be adjusted by altering the number of extension segments connected to the base and one another.

* * * * *